US006801011B2

(12) United States Patent
Ide

(10) Patent No.: US 6,801,011 B2
(45) Date of Patent: Oct. 5, 2004

(54) MAGNETIC POLE POSITION ESTIMATING METHOD AND CONTROL APPARATUS FOR SYNCHRONOUS MOTOR

(75) Inventor: Kozo Ide, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 0 days.

(21) Appl. No.: 10/472,816

(22) PCT Filed: Mar. 22, 2002

(86) PCT No.: PCT/JP02/02740

§ 371 (c)(1),
(2), (4) Date: Sep. 25, 2003

(87) PCT Pub. No.: WO02/078167

PCT Pub. Date: Oct. 3, 2002

(65) Prior Publication Data

US 2004/0113582 A1 Jun. 17, 2004

(30) Foreign Application Priority Data

Mar. 26, 2001 (JP) .................................. 2001-087228

(51) Int. Cl.[7] .............................................. H02P 1/46
(52) U.S. Cl. .................. 318/700; 318/705; 318/718; 318/721; 318/632; 318/609; 318/254
(58) Field of Search ................................ 318/254, 138, 318/439, 632, 700, 705, 718, 721, 609, 610

(56) References Cited

U.S. PATENT DOCUMENTS

| | | | | |
|---|---|---|---|---|
| 5,323,094 A | * | 6/1994 | Kaneda et al. ............... | 318/254 |
| 5,844,385 A | * | 12/1998 | Jones et al. .................. | 318/254 |
| 6,005,364 A | * | 12/1999 | Acarnley ..................... | 318/632 |
| 6,218,795 B1 | * | 4/2001 | Syukuri ........................ | 318/254 |
| 6,462,492 B1 | * | 10/2002 | Sakamoto et al. .......... | 318/254 |

FOREIGN PATENT DOCUMENTS

| JP | 2001-69777 A | 3/2001 |
|---|---|---|
| JP | 2001-286198 A | 10/2001 |
| JP | 2001-171798 A | 6/2002 |

OTHER PUBLICATIONS

M. Schroedl, "Sensorless control of induction motors at low speed and standstill, "in Proceeding ICEM '92 (International Conference on Electrical Machines Sep. 1992, pp. 863–867.

M.J. Corley and R.D. Lorenz, "Rotor Position and Velocity Estimation for a Salient–Pole Permanent Magnet Synchronous Machine at Standstill and High Speeds", IEEE Transactions on Industry Applications, vol. 34, No. 4, Jul./Aug., pp. 784–789, 1998.

Yamano, Naguchi, Kondoh "Position Sensorless Speed Control of Saliency–type PM Motor including Low Speed Region", Technical Meeting on Semiconductor Power Converter, IEEE Japan, SPC–97–13, pp. 75–82, 1997.

* cited by examiner

Primary Examiner—Rina Duda
(74) Attorney, Agent, or Firm—Sughrue Mion, PLLC

(57) ABSTRACT

The invention has an object to provide a magnetic pole position estimating method and a control apparatus for a synchronous motor which reliably detect the position of a magnetic pole of the synchronous motor to carry out stable control also when a high load is applied or a load is suddenly changed. A coordinate transformer (8) transforms a detected current value $i_s$ into an impedance observation axis positioned in a place shifted from an estimated magnetic pole position $\hat{\theta}$ by 45 degrees. A high-frequency impedance estimator (10) estimates high-frequency impedances $Z_{dm}$ and $Z_{qm}$ on two points which are advanced and delayed by an electrical angle of 45 degrees from a γ-axis. A first magnetic pole position estimator (13) estimates a first magnetic pole position estimated value $\hat{\theta}$ to eliminate a deviation between the high-frequency impedances $Z_{dm}$ and $Z_{qm}$. A second magnetic pole position estimator (14) inputs a current command value $i\delta^*$ to estimate an internal phase angle compensating angle $\hat{\theta}_r$ and subtracts the internal phase angle compensating angle $\hat{\theta}_r$ from the first magnetic pole position estimated value $\hat{\theta}$, and outputs a second magnetic pole position $\hat{\theta}_c$.

4 Claims, 6 Drawing Sheets

PRIOR ART

LOCUS OF HIGH-FREQUENCY IMPEDANCE

SHIFT OF HIGH-FREQUENCY IMPEDANCE

MAGNETIC POLE POSITION ESTIMATING METHOD AND CONTROL APPARATUS FOR SYNCHRONOUS MOTOR

TECHNICAL FIELD

The present invention relates to a control apparatus for a synchronous motor which controls the synchronous motor by speed sensorless vector control, and more particularly to a method of estimating the position of a magnetic pole for the synchronous motor.

BACKGROUND ART

Vector control is taken as one of methods of carrying out the control of a synchronous motor. The vector control is intended for maintaining a phase difference between an exciting current (a d-axis current) held to be constant and a torque current (a q-axis current) corresponding to a necessary torque to be an electrical angle of 90 degrees, thereby obtaining an efficiency and a responsiveness which are equivalent to or more than those of D.C. motors.

In general, it is necessary to measure the speed of the synchronous motor by using a speed sensor in order to carry out the vector control of the synchronous motor. However, it is advantageous that the speed sensor is not adopted in respect of a cost and a reliability. For this reason, there is used speed sensorless vector control for estimating the synchronous motor speed without actually measuring the synchronous motor speed by the speed sensor and carrying out vector control by using an estimated value. In the speed sensorless vector control, the position of a magnetic pole is first estimated and a speed is estimated from the position of the magnetic pole in order to estimate the speed of the synchronous motor.

Conventionally, a synchronous motor control method for estimating the position of the magnetic pole of the synchronous motor in a zero frequency region in which the driving frequency of the synchronous motor is almost zero, that is, during a super-low speed operation, thereby outputting a suitable torque for a load has been reported by the following document.

Reference 1: M. Schroedl, "Sensorless control of induction motors at low speed and standstill," in Proceedings ICEM' 92 (International Conference on Electrical Machines September 1992), pp. 863–867.

Reference 2: M. J. Corley and R. D. Lorenz, "Rotor Position and Velocity Estimation for a Salient-Pole Permanent Magnet Synchronous Machine at Standstill and High Speeds", IEEE Transactions on Industry Applications, Volume 34, Number 4, July/August, pp.784–789, 1998.

Reference 3: Yamano, Noguchi, Kondoh "Position Sensorless Speed Control Method of Saliency-type PM Motor including Low Speed Region", Technical Meeting on Semiconductor Power Converter, IEEE Japan, SPC-97-13, pp. 75–82, 1997.

These methods feature that a high-frequency voltage or high-frequency current having a different frequency from a driving frequency is superposed on a synchronous motor and the synchronous motor is controlled by using the position of a magnetic pole which is estimated based on the electrical saliency of the structure of a rotor.

FIG. 1 shows an example of a control apparatus for estimating the position of a magnetic pole to control a synchronous motor according to the conventional art described above.

The control apparatus for the synchronous motor according to the conventional art is constituted by a PWM voltage type inverter (PWM VSI: Voltage Source Inverter) 2, a high-frequency generator 4, a two-phase and three-phase transformer 3, a current controller 5, a low-pass filter (LPF) 6, d-q transformers 7 and 8, a bandpass filter (BPF) 9, a high-frequency impedance estimator 10, a magnetic pole position estimator 21, a current detector 12, an adder 38 and subtractors 39 to 41, and carries out the vector control of a synchronous motor 1.

The subtractors 39 and 40 subtract actual current values iγ and iδ from current commands iγ* and iδ*, respectively. The current controller 5 executes the current control by generating and outputting the voltage commands Vγ* and Vδ* in such a way that each of the deviations between the current values iγ, iδ and their corresponding current command values iγ*, iδ*, which are output from the subtractors 39 and 40, becomes zero.

The high-frequency generator 4 generates a high-frequency voltage $V_{inj}$ having a frequency $f_{inj}$ which is different from a driving frequency. The adder 38 adds the high-frequency voltage $V_{inj}$ generated by the high-frequency generator 4 to a γ component (a magnetic flux component) Vγ* of a voltage command value to be an output from the current controller 5.

The two-phase and three-phase transformer 3 converts a result of the addition in the adder 38 and a δ component (a torque component) Vδ* of the voltage command value into a three-phase voltage command value and gives a command to the PWM voltage type inverter 2. The PWM voltage type inverter 2 controls the synchronous motor 1 based on the command given from the two-phase and three-phase transformer 3.

Moreover, the current detector 12 detects a current value $i_s$ of the synchronous motor 1. The d-q transformer 7 coordinate transforms the current value $i_s$ detected by the current detector 12 into a control axis by using an estimated magnetic pole position θ^.

The low-pass filter (LPF) 6 feeds back, to the subtractor 39, a value obtained by removing the same frequency component $f_{inj}$ as the high-frequency voltage $V_{inj}$ superposed by the adder 38 from the current value coordinate transformed into the control axis by the d-q transformer 7. By such a structure, the current control is executed in such a manner that each of the deviations between the exciting component (iγ*), the torque component (iδ*) and their corresponding current command values is set to be zero by the current controller 5.

The subtractor 41 subtracts 45 degrees (π/4 radian) from the estimated magnetic pole position θ^. The d-q transformer 8 converts the phase of the detected current value $i_s$ into that of the subtractor 41, thereby transforming the detected current value $i_s$ into an impedance observation axis positioned in a place shifted from the estimated magnetic pole position θ^ by 45 degrees.

The bandpass filter (BPF) 9 extracts the component of the same frequency component $f_{inj}$ as the high-frequency voltage command value $V_{inj}$ superposed by the adder 38, and inputs high-frequency current components $i_{dm}$ and $i_{qm}$ thus extracted and the high-frequency voltage command value $V_{inj}$ to the high-frequency impedance estimator 10. The high-frequency impedance estimator 10 estimates high-frequency impedances $Z_{dm}$ and $Z_{qm}$ on two points which are advanced and delayed from a γ axis by an electrical angle of 45 degrees.

A magnetic pole position estimator 13 estimates such a magnetic pole position θ^ that two high-frequency impedances $Z_{dm}$ and $Z_{qm}$ are equal to each other. Moreover, the magnetic pole position estimator 13 is constituted by a subtractor 31, a multiplier 32 and an integrator 33 as shown in FIG. 2. The subtractor 31 obtains a difference between the high-frequency impedances $Z_{qm}$ and $Z_{dm}$. The multiplier 32 outputs a value obtained by multiplying an output sent from the subtractor 31 by a control gain ($K_p+K_i/s$). $K_p$ represents a proportional gain and $K_i$ represents an integral gain. The integrator 33 integrates the output value of the multiplier 32 and outputs the integrated value as the estimated magnetic pole position $\theta^{\wedge}$. In other words, the magnetic pole position estimator 13 regulates a PI regulator comprising the subtractor 31 and the integrator 32 in such a manner that $Z_{dm}$ and $Z_{qm}$ are coincident with each other, and an output is integrated by the integrator 33 to obtain the magnetic pole position estimated value $\theta^{\wedge}$.

Next, description will be given to the operation of the control apparatus for the synchronous motor according to the conventional art.

In the control apparatus for the synchronous motor according to the conventional art shown in FIG. 1, a high-frequency voltage which is different from a driving frequency is generated in the high-frequency generator 4 and is added to the γ component (the magnetic flux component) of a voltage command value to be the output of the current controller 5. A result of the addition and the δ component (the torque component) of the voltage command value are converted into three-phase voltage command values in the two-phase and three-phase transformer 3, and a command is given to the PWM voltage type inverter, thereby supplying the three-phase voltage command value to the synchronous motor 1. A current flowing to the synchronous motor 1 at that time is coordinate transformed into a control axis by using an estimated magnetic pole position in the d-q transformer 7, and a value obtained by removing the same frequency component as the superposed high-frequency voltage is fed back in the low-pass filter (LPF) 6, and current control is executed in such a manner that a deviation between-each of the exciting component (iγ*) and the torque component (iδ*) and a current command value is set to be zero in the current controller 5. On the other hand, in the d-q transformer 8, a detected current is converted into an impedance observation axis shifted from the estimated magnetic pole position by 45 degrees. In the band-pass filter (BPF) 9, the superposed high-frequency component is extracted and the high-frequency current component thus extracted and the high-frequency voltage command value are input to the high-frequency impedance estimator 10. The high-frequency impedances $Z_{dm}$ and $Z_{qm}$ are estimated on two points which are advanced and delayed from the γ axis by an electrical angle of 45 degrees in the high-frequency impedance estimator 10, and the position of a magnetic pole is estimated in such a manner that the two impedances are equal to each other by the magnetic pole position estimator 13 shown in FIG. 2.

In the control apparatus for the synchronous motor according to the conventional art, there is utilized a phenomenon (an electrical saliency) in which the impedance is varied in a direction of a main magnetic flux (a d-axis) and a direction shifted by an electrical angle of 90 degrees (a q-axis) as shown in FIG. 3 by the structure of a rotor or the influence of magnetic saturation in the observation of the impedance in the superposed high-frequency component. If an estimated magnetic flux axis (a γ-axis) is regulated in such a manner that the deviation of the impedance is zero as shown in FIG. 4, the γ-axis is finally coincident with the d-axis to be an actual magnetic flux axis so that the position of a magnetic pole can be estimated.

However, the magnetic pole position estimating method can estimate the position of a main magnetic flux which is synthesized by the magnetic flux of a magnet and the reaction of an armature and cannot estimate the position of the magnetic pole. In some cases in which a high load is applied or a load is suddenly changed, accordingly, an error of the position of a magnetic pole and that of an estimated magnetic pole is increased so that control is disabled.

In the case in which the load of the motor is increased as shown in FIG. 5, actually, the main magnetic flux is shifted toward the opposite side to the direction of rotation of a rotor and the electrical saliency is also shifted in the same direction as the shift of the main magnetic flux. The reason is that a magnetic flux generated by the current of an armature is increased with an increase in the load and the main magnetic flux synthesized with the magnetic flux of a magnet is delayed by an internal phase angle depending on the position of a magnetic pole. In the conventional magnetic pole position estimating method, accordingly, in the case of the position of a magnetic pole being estimated in a state where a load is applied to a motor, the position of the magnetic pole to be estimated is the position of the main magnetic flux so that an offset corresponding to the internal phase angle is always present between the γ-axis and the d-axis. For this reason, even if the γ-axis and the d-axis are to be coincident with each other, they are immediately shifted by the internal phase angle. In the case of a load being suddenly applied, therefore, it can also be supposed that control is disabled.

DISCLOSURE OF THE INVENTION

It is an object of the invention to provide a control apparatus for a synchronous motor which can reliably detect the position of a magnetic pole when a high load is applied or a load is suddenly changed, thereby carrying out stable control.

In order to achieve the object, the invention provides a control apparatus for a synchronous motor which superposes a high-frequency voltage having a different frequency from a driving frequency on an exciting component of a voltage command value or a current command value for controlling the synchronous motor, thereby generating an electrical saliency on an impedance in a high-frequency region, estimates a position of a magnetic pole based on the saliency so as to be a first magnetic pole position, multiplies a torque component of a current command value by a proportional constant, thereby calculating an internal phase angle compensating angle, and subtracts the calculated internal phase angle compensating angle from the first magnetic pole position, thereby setting a second magnetic pole position.

In the invention, first of all, a high-frequency voltage or high-frequency current having a different frequency from a driving frequency is superposed on a synchronous motor to generate an electrical saliency on an impedance in a high-frequency region by magnetic saturation caused by a main magnetic flux and a skin effect produced by a high frequency. The position of a magnetic pole which is estimated based on the saliency is set to be a first magnetic pole position. In a state in which a load is not applied to the synchronous motor, a control axis (a γ-axis) and a d-axis are maintained to be coincident with each other when the first magnetic pole position is estimated. In a state in which the load is applied to the synchronous motor, however, the d-axis has an offset corresponding to an internal phase angle with respect to the control axis. Consequently, it is possible to calculate an internal phase angle compensating angle by multiplying the torque component of a current command value by a proportional constant and to estimate a second magnetic pole position to be the true position of the d-axis by subtracting the internal phase angle compensating angle thus calculated from the first magnetic pole position.

Vector control is executed by using the second magnetic pole position. Also in the case in which a high load is applied or a load is suddenly changed, consequently, an impedance observation axis is moved in such a direction that an electrical saliency is shifted corresponding to the load and a control axis is corrected to be put within such a range that control is always stabilized. Accordingly, stable control can be carried out so that it is possible to eliminate a conventional drawback that the position of a magnetic flux cannot be detected when a high load is applied or a load is suddenly changed.

BEST MODE OF CARRYING OUT THE INVENTION

Next, an embodiment of the invention will be described in detail with reference to the drawings.

Figure 6:
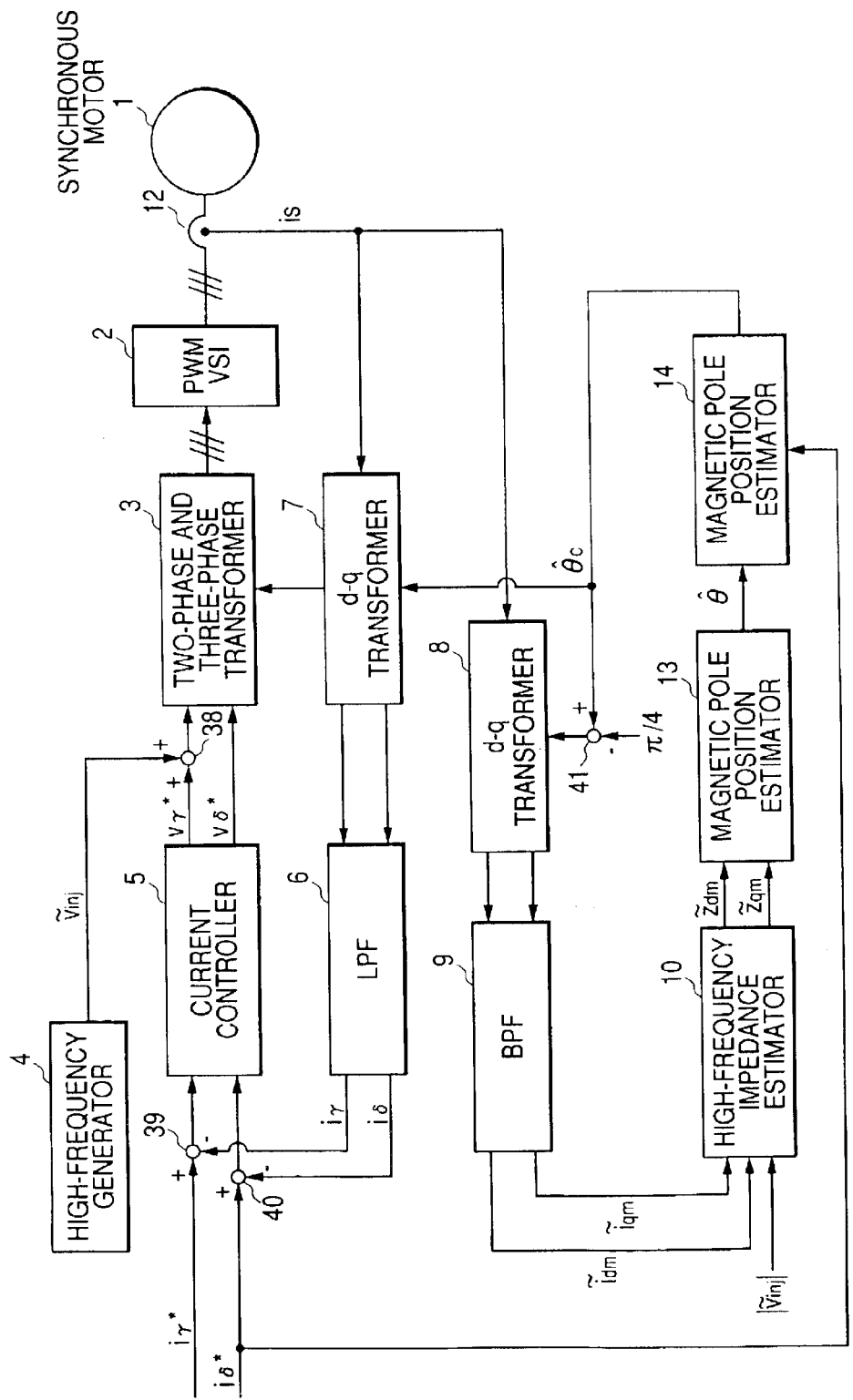
FIG. 6 is a control block diagram showing the structure of a control apparatus for a synchronous motor according to an embodiment of the invention.

FIG. 6 is a block diagram showing the structure of a control apparatus for a synchronous motor according to the embodiment of the invention. In FIG. 6, the same components as those in FIG. 1 have the same reference numerals and description will be omitted.

Figure 1:
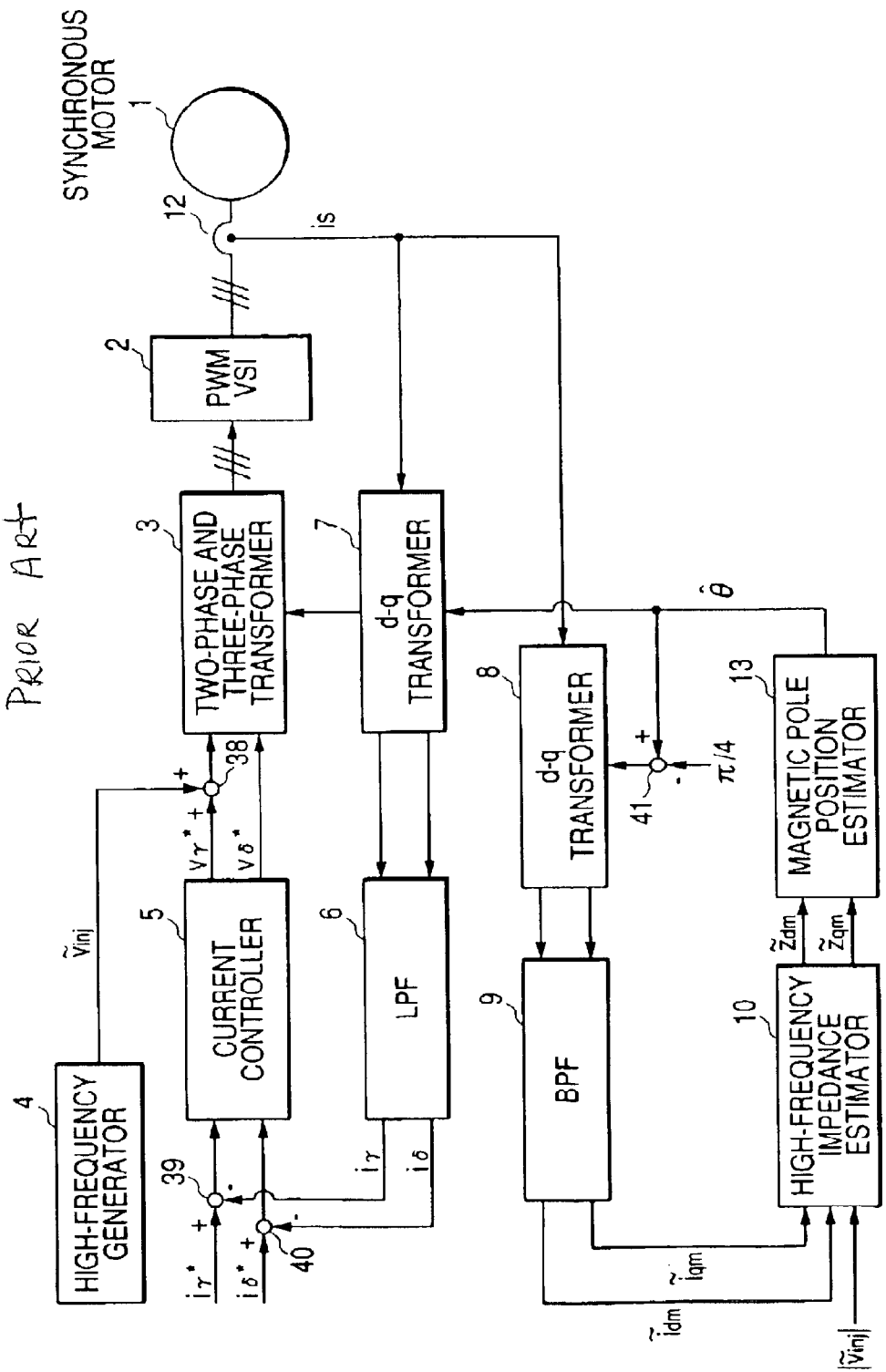
FIG. 1 is a block diagram showing the structure of a control apparatus for a synchronous motor according to the conventional art.
Figure 2:
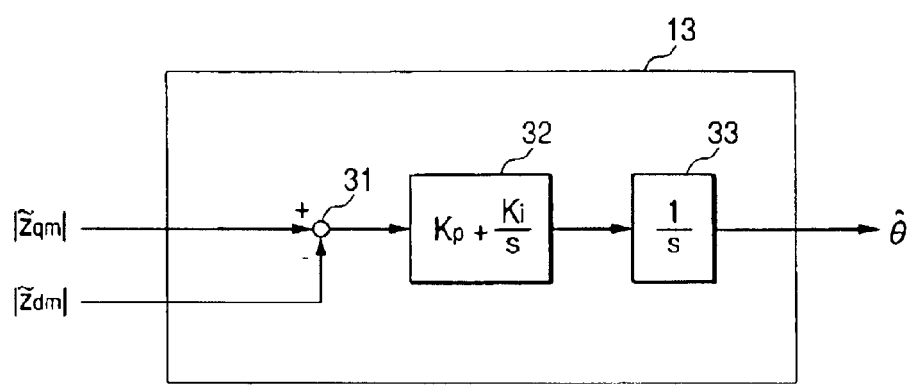
FIG. 2 is a block diagram for explaining the structure of a magnetic pole position estimator 13 in FIG. 1.
Figure 3:
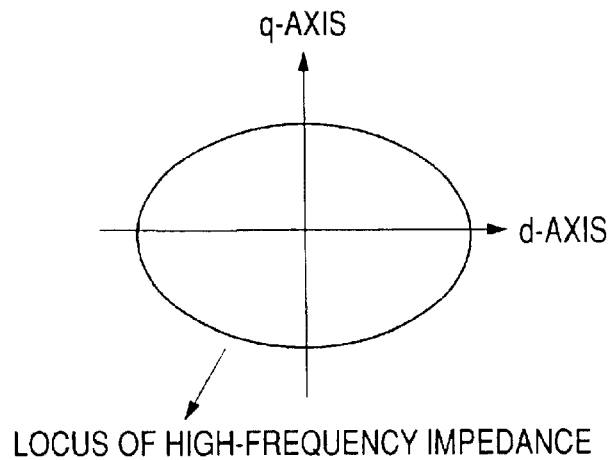
FIG. 3 is a diagram showing a high-frequency impedance locus when a load is not applied.
Figure 4:
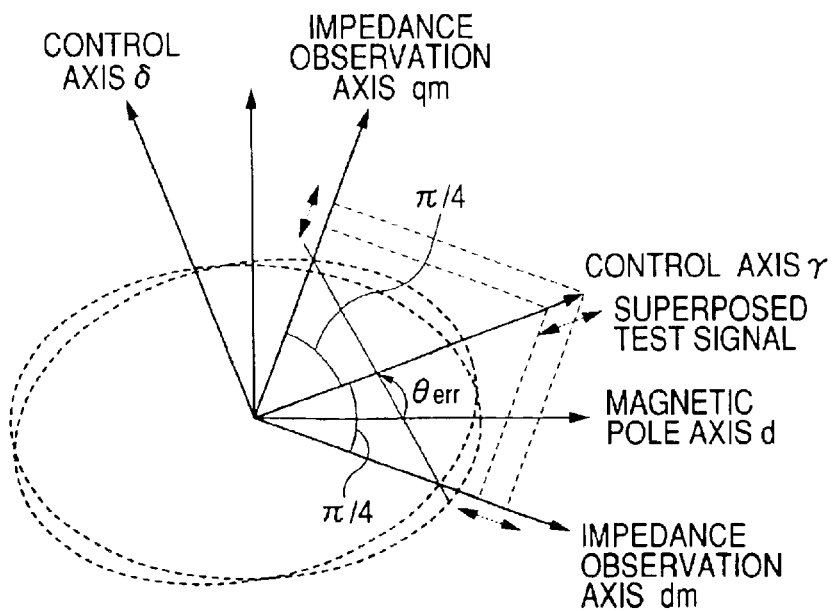
FIG. 4 is a diagram for explaining the relationship among a secondary magnetic flux axis, a control axis γ, a d-axis and impedance observation axes qm and dm.
Figure 5:
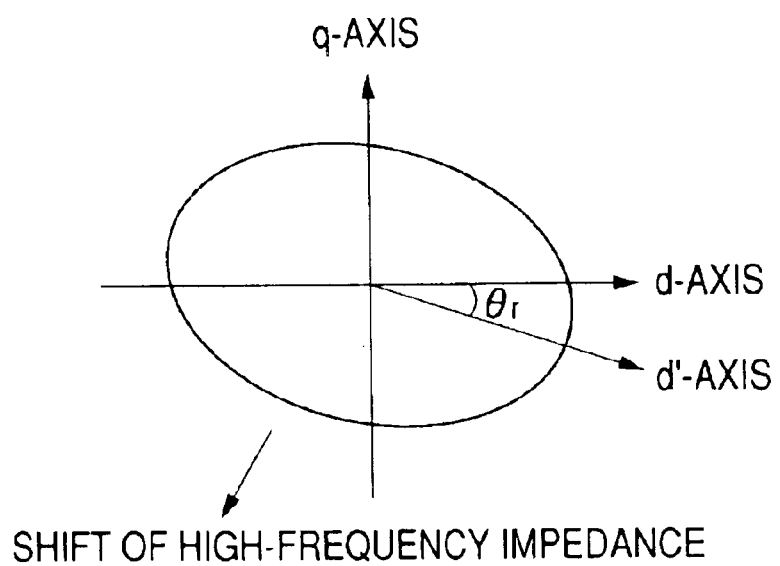
FIG. 5 is a diagram showing a high-frequency impedance locus obtained when a load is applied to the synchronous motor.

In the control apparatus for the synchronous motor according to the embodiment, the control apparatus for the synchronous motor according to the conventional art shown in FIG. 1 is newly provided with a magnetic pole position estimator 14 for setting a magnetic pole position estimated value θ^ estimated by a magnetic pole position estimator 13 to be a first magnetic pole position estimated value and for subtracting an internal phase angle from the first magnetic pole position estimated value θ^ to set a second magnetic pole position estimated value θ^.

In the control apparatus for the synchronous motor according to the embodiment, the magnetic pole position estimator 14 is newly provided. Consequently, a d-q transformer 7 and a subtractor 41 carry out a processing such as a conversion or an operation by using the second magnetic pole position estimated value θc^ in place of the first magnetic pole position estimated value θ^.

The magnetic pole position estimator 13 estimates the first magnetic pole position estimated value θ^ to eliminate a deviation between high-frequency impedances $Z_{dm}$ and $Z_{qm}$.

The magnetic pole position estimator 14 calculates an internal phase angle compensating angle θr based on a current command value iδ* and subtracts the internal phase angle compensating angle θr thus calculated from the first magnetic pole position estimated value θ^ calculated by the magnetic pole position estimator 13, thereby calculating the second magnetic pole position estimated value θ^.

Next, the structure of the magnetic pole position estimator 14 will be described in more detail with reference to FIG. 7.

Figure 7:
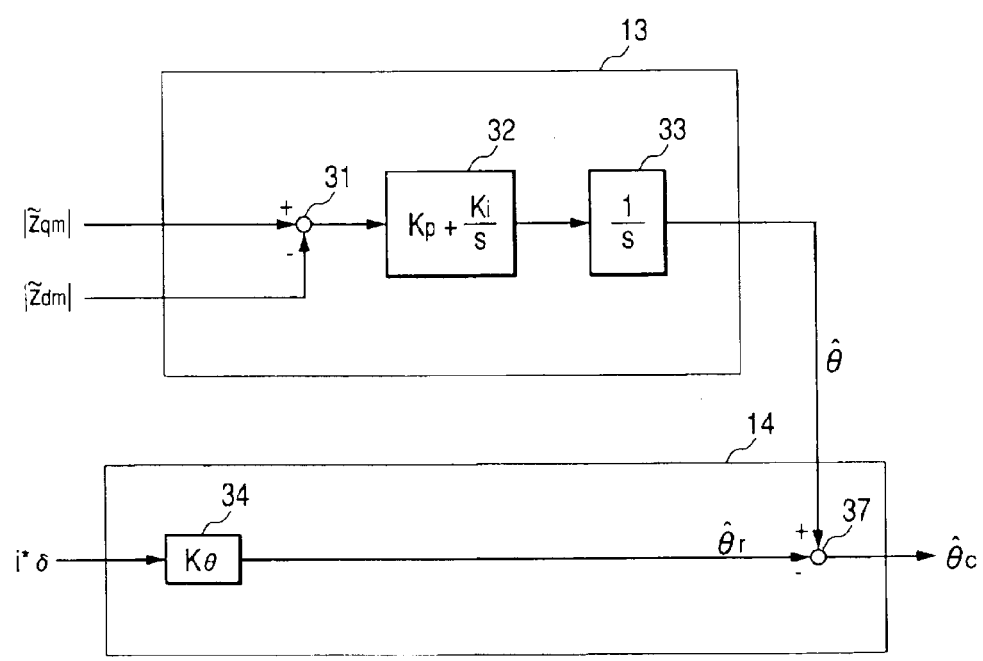
FIG. 7 is a block diagram for explaining the structures of a magnetic pole position estimator 13 and a magnetic pole position estimator 14 in FIG. 6.

The magnetic pole position estimator 14 is constituted by a multiplier 34 and a subtractor 37 as shown in FIG. 7.

The multiplier 34 outputs, as an internal phase angle compensating angle θr^, a value obtained by multiplying a torque component current command value (iδ*) by a proportional constant Kθ. The subtractor 37 outputs, as the second magnetic pole position estimator θc^, a value obtained by subtracting the internal phase angle compensating angle θr^ acquired by the multiplier 34 from the first magnetic pole position estimated value θ^ estimated by the magnetic pole position estimator 13.

According to the control apparatus for the synchronous motor in accordance with the embodiment, first of all, a deviation between the high-frequency impedances $Z_{dm}$ and $Z_{qm}$ is eliminated by the magnetic pole position estimator 13 to obtain the first magnetic pole position estimated value θ^, and the internal phase angle compensating angle θr^ included in the first magnetic pole position estimated value θ^ is then acquired from the torque component current command value (iδ*) by the magnetic pole position estimator 14, and a value obtained by subtracting the internal phase angle compensating angle θr^ from the first magnetic pole position estimated value θ^ is set to be the second magnetic pole position estimated value θc^. If the synchronous motor is controlled by using the second magnetic pole position estimated value θc^, a suitable torque can be output even if a high load is applied or a load is suddenly changed. Also in a zero frequency region, therefore, the synchronous motor can be controlled stably.

While a high-frequency voltage $V_{inj}$ is superposed on an exciting component voltage command value Vγ* and the current value of a synchronous motor 1 is detected to measure a high-frequency impedance, thereby estimating the position of a magnetic pole in the embodiment, the invention is not restricted to such a case. Even if the high-frequency voltage $V_{inj}$ is superposed on an exciting component current command value iγ* to detect the voltage value of the synchronous motor 1, thereby measuring a high-frequency impedance to estimate the position of a magnetic pole, the same advantages can be obtained.

What is claimed is:

1. A magnetic pole position estimating method for a synchronous motor, comprising the steps of:

superposing a high-frequency voltage having a different frequency from a driving frequency on an exciting component of a voltage command value for controlling the synchronous motor, thereby generating an electrical saliency on an impedance in a high-frequency region;

estimating a position of a magnetic pole based on the saliency so as to be a first magnetic pole position;

multiplying a torque component of a current command value by a proportional constant, thereby calculating an internal phase angle compensating angle; and subtracting the calculated internal phase angle compensating angle from the first magnetic pole position, thereby setting a second magnetic pole position.

2. A magnetic pole position estimating method for a synchronous motor, comprising the steps of:
   superposing a high-frequency current having a different frequency from a driving frequency on an exciting component of a current command value for controlling the synchronous motor, thereby generating an electrical saliency on an impedance in a high-frequency region;
   estimating a position of a magnetic pole based on the saliency so as to be a first magnetic pole position;
   multiplying a torque component of a current command value by a proportional constant, thereby calculating an internal phase angle compensating angle; and
   subtracting the calculated internal phase angle compensating angle from the first magnetic pole position, thereby setting a second magnetic pole position.

3. A control apparatus for a synchronous motor which separates a current value of the synchronous motor into a magnetic flux component and a torque component based on an estimated value of a position of a magnetic pole and independently controls the respective current values, thereby controlling the synchronous motor, comprising:
   a high-frequency voltage generator for superposing a high-frequency voltage on a voltage command value of a control axis (a γ-axis) of the synchronous motor;
   a coordinate transformer for transforming a phase of the current value of the synchronous motor into a position having an electrical angle of 45 degrees with the control axis interposed therebetween;
   a high-frequency component extractor for extracting a signal having the same frequency component as a frequency component of the high-frequency voltage superposed by the high-frequency generator from an output current of the coordinate transformer;
   a high-frequency impedance estimator for estimating a high-frequency impedance on two points which are advanced and delayed from the control axis by the electrical angle of 45 degrees based on a current extracted by the high-frequency component extractor and the high-frequency voltage respectively and for estimating a deviation between the impedances on the two points;
   a first magnetic pole position estimator for estimating, as a first magnetic pole position, such a magnetic pole position that the deviation between the two high-frequency impedances is zero; and
   a second magnetic pole position estimator for multiplying a torque component of a current command value by a proportional constant to calculate an internal phase angle compensating angle and for subtracting the calculated internal phase angle compensating angle from the first magnetic pole position to set a second magnetic pole position.

4. A control apparatus for a synchronous motor which separates a current value of the synchronous motor into a magnetic flux component and a torque component based on an estimated value of a position of a magnetic pole and independently controls the respective current values, thereby controlling the synchronous motor, comprising:
   a high-frequency current generator for superposing a high-frequency current on a current command value of a control axis (a γ-axis) of the synchronous motor;
   a coordinate transformer for transforming a phase of a voltage value of the synchronous motor into a position having an electrical angle of 45 degrees with the control axis interposed therebetween;
   a high-frequency component extractor for extracting a signal having the same frequency component as a frequency component of the high-frequency current superposed by the high-frequency generator from an output voltage of the coordinate transformer;
   a high-frequency impedance estimator for estimating a high-frequency impedance on two points which are advanced and delayed from the control axis by the electrical angle of 45 degrees based on a voltage extracted by the high-frequency component extractor and the high-frequency current respectively and for estimating a deviation between the impedances on the two points;
   a first magnetic pole position estimator for estimating, as a first magnetic pole position, such a magnetic pole position that the deviation between the two high-frequency impedances is zero; and
   a second magnetic pole position estimator for multiplying a torque component of a current command value by a proportional constant to calculate an internal phase angle compensating angle and for subtracting the calculated internal phase angle compensating angle from the first magnetic pole position to set a second magnetic pole position.

* * * * *